US009996063B2

(12) United States Patent
Miyazaki et al.

(10) Patent No.: US 9,996,063 B2
(45) Date of Patent: Jun. 12, 2018

(54) TRANSMITTER

(71) Applicant: YOKOGAWA ELECTRIC CORPORATION, Musashino-shi, Tokyo (JP)

(72) Inventors: Hiroshi Miyazaki, Musashino (JP); Takafusa Nakayama, Musashino (JP); Yosuke Iwata, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 436 days.

(21) Appl. No.: 14/221,787

(22) Filed: Mar. 21, 2014

(65) Prior Publication Data

US 2014/0297046 A1 Oct. 2, 2014

(30) Foreign Application Priority Data

Mar. 26, 2013 (JP) .................. 2013-063685

(51) Int. Cl.
| | |
|---|---|
| *G06F 3/048* | (2013.01) |
| *G05B 15/02* | (2006.01) |
| *G06F 3/0487* | (2013.01) |
| *G06F 3/0362* | (2013.01) |

(Continued)

(52) U.S. Cl.
CPC ........... *G05B 15/02* (2013.01); *G06F 3/0362* (2013.01); *G06F 3/0482* (2013.01); *G06F 3/0487* (2013.01); *G06F 3/04847* (2013.01)

(58) Field of Classification Search
CPC .. G06F 3/0481; G06F 3/0362; G06F 3/04847; G06F 17/2217; G05D 7/0635;
(Continued)

(56) References Cited

U.S. PATENT DOCUMENTS

| | | | |
|---|---|---|---|
| 2002/0132617 A1* | 9/2002 | Nuss ...................... | H04H 20/82 455/414.3 |
| 2005/0037814 A1 | 2/2005 | Yasui et al. | |

(Continued)

FOREIGN PATENT DOCUMENTS

| | | |
|---|---|---|
| JP | 04-198726 A | 7/1992 |
| JP | 9247948 A | 9/1997 |

(Continued)

OTHER PUBLICATIONS

Communication dated Feb. 20, 2015 issued by the European Patent Office in counterpart European Patent Application No. 14161622.7.

*Primary Examiner* — Ajay M Bhatia
*Assistant Examiner* — Alex Olshannikov
(74) *Attorney, Agent, or Firm* — Sughrue Mion, PLLC (57) ABSTRACT

There is provided a transmitter. The transmitter includes: a display portion; an first input receiver configured to receive a first selecting operation for selecting one of setting items and a second selecting operation for selecting one of setting values; and a second input receiver configured to receive a switching operation for sequentially switching the setting values of the selected setting item, wherein the second input receiver is rotated in a first rotation direction or in a second rotation direction opposite to the first rotation direction; and a first controller configured to display the setting values of the selected setting item on the display portion such that the setting values are sequentially switched in a forward direction or a backward direction when the second input receiver is rotated in the first rotation direction or the second rotation direction by the switching operation.

12 Claims, 8 Drawing Sheets

(51) Int. Cl.
*G06F 3/0482* (2013.01)
*G06F 3/0484* (2013.01)

(58) Field of Classification Search
CPC ......... Y10T 137/0396; Y10T 137/7759; Y10T 137/1866; Y10T 137/0324; Y10T 137/8766; G01L 19/00; A01G 25/167; F04D 15/0088; F04D 13/00; G01K 13/02; G05B 15/02
USPC .......................................... 715/764; 700/282
See application file for complete search history.

(56) References Cited

U.S. PATENT DOCUMENTS

| | | | |
|---|---|---|---|
| 2007/0132733 A1* | 6/2007 | Ram | G06F 3/0227 345/163 |
| 2008/0040685 A1 | 2/2008 | Kolletzki | |
| 2009/0198359 A1* | 8/2009 | Chaudhri | G06F 3/0482 700/94 |
| 2009/0317304 A1* | 12/2009 | Hirafuji | B01L 3/022 422/400 |
| 2010/0096018 A1* | 4/2010 | Wylie | F24D 17/0078 137/2 |
| 2013/0235000 A1* | 9/2013 | Lee | G06F 3/0227 345/184 |

FOREIGN PATENT DOCUMENTS

| | | |
|---|---|---|
| JP | 10-009989 A | 1/1998 |
| JP | 2000231689 A | 8/2000 |
| JP | 2006292702 A | 10/2006 |
| JP | 2013-30349 A | 2/2013 |

* cited by examiner

| LOCAL_OP_ENABLE | WRITE_LOCK | OPERATION |
|---|---|---|
| VALIDATED | INVALIDATED | OPERATION ENABLED, SETTING ENABLED |
| VALIDATED | VALIDATED | OPERATION ENABLED, SETTING DISABLED |
| INVALIDATED | INVALIDATED/VALIDATED | OPERATION DISABLED, SETTING DISABLED |

TRANSMITTER

CROSS-REFERENCE TO RELATED APPLICATION

This application claims priority from Japanese Patent Applications No. 2013-063685, filed on Mar. 26, 2013, the entire contents of which are herein incorporated by reference.

BACKGROUND

1. Technical Field

The present disclosure relates to a transmitter. Particularly, the present disclosure relates to improvement in inputting and setting attribute information of the transmitter.

2. Description of the Related Art

In a process control system, various measured physical amounts such as pressures, temperatures, flow rates, etc. in respective portions of a process piping system are converted into electric signals and the electric signals are transmitted to an instrument panel room. To this end, various transmitters are used for the respective portions of the process piping system.

In some of the transmitters, operation portions are provided so that attribute information unique to the transmitters can be inputted and set by the transmitters alone without use of any other tools in installation sites upon initial setting, maintenance and inspection work during plant operation, device replacement work, etc.

Figure 7A:
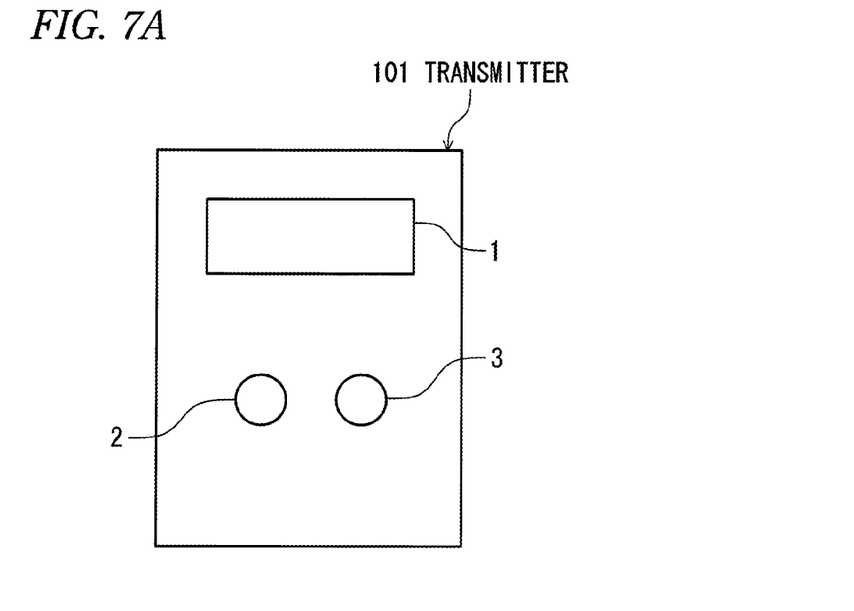
FIGS. 7A and 7B are views of conceptual examples of related-art transmitters.
Figure 7B:
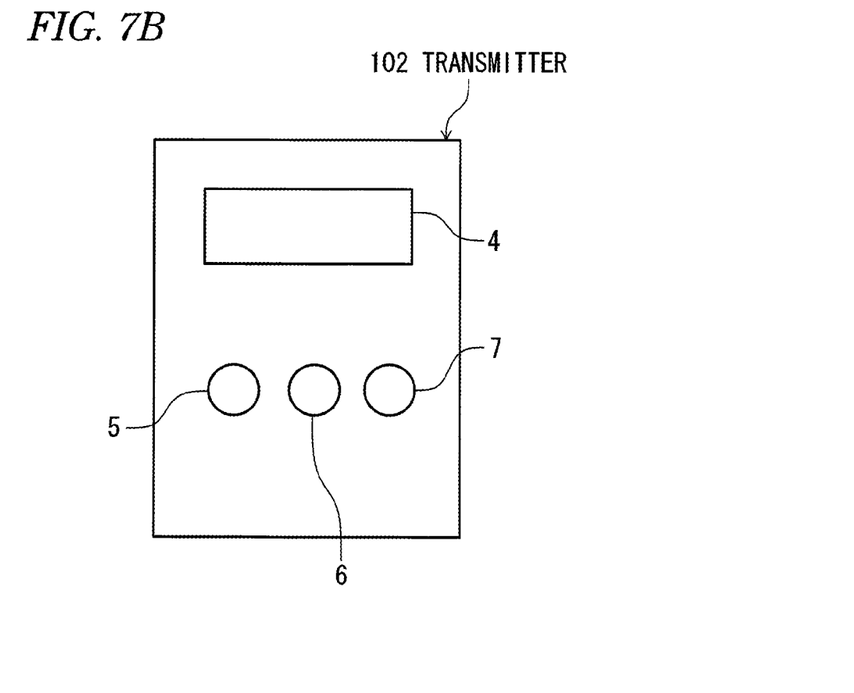

FIGS. 7A and 7B are views of conceptual examples of related-art transmitters 101 and 102. In the transmitter 101 shown in FIG. 7A, two operation buttons 2 and 3 for operating switches are provided under a display portion 1. In the transmitter 102 shown in FIG. 7B, three operation buttons 5 to 7 are provided under a display portion 4.

In the transmitter 101 shown in FIG. 7A, for example, a function of selecting one from setting items and one from setting values is assigned to the operation button 2, and a function of determining the setting item and the setting value which have been switched and selected by the operation button 2 is assigned to the operation button 3.

When the operation button 2 is pushed down intermittently, the character string of the setting item can be switched sequentially and cyclically, for example, from "address" back to "address" via "calibration", "unit", "damping", "display", "identification" and "end". The character string of the setting item is switched and displayed on the display portion 1 sequentially in connection with the pushing-down operation of the operation button 2.

When the operation button 3 is pushed down, the setting item selected by the operation button 2 at that point of time is determined as a subject whose setting value will be changed. Thus, the mode is changed over to a change mode in which the setting value of the determined setting item can be switched from one to another in a predetermined direction (for example, in an ascending direction). Then, the setting value in the setting item is switched and displayed on the display portion 1 sequentially in connection with the pushing-down operation of the operation button 2.

Assume that the operation button 3 is pushed down in the state in which the setting value switched to a desired one has been displayed by the pushing-down operation of the operation button 2. In this case, the value selected thus is determined as the setting value of the setting item selected and determined by the operation button 2, and inputted to a not-shown signal processor.

In the case where a numerical string is inputted and set as the setting value, the operation button 2 is pushed down to select a numerical value for each digit and the operation button 3 is then pushed down to shift the current digit to a next digit.

In the transmitter 102 as shown in FIG. 7B, for example, a function of selecting one from setting items is assigned to the operation button 5, a function of selecting one from setting values in an ascending direction is assigned to the operation button 6 and a function of selecting one from the setting values in a descending direction is assigned to the operation button 7.

When the operation button 5 is pushed down intermittently, the setting item can be switched sequentially and cyclically, for example, from "address" back to "address" via "calibration", "unit", "damping", "display", "identification" and "end" in the same manner as in FIG. 7A. The setting item is switched and displayed on the display portion 4 sequentially in connection with the pushing-down operation of the operation button 5.

When the operation button 6 or the operation button 7 is pushed down in the state in which a desired setting item has been displayed on the display portion 4, the setting value in the setting item can be switched and selected from one to another.

When the operation button 5 is pushed down in the state in which the setting value switched to a desired one has been selected and displayed by the operation button 6 or the operation button 7, the value selected thus is determined as the setting value and inputted to a not-shown signal processor.

In the case where a numerical string is inputted and set as the setting value, the operation button 6 or the operation button 7 is pushed down to change only the numerical value in the least significant digit to thereby change numerical values in higher-order digits (the tenth place and the hundredth place).

A technique for performing setting by means of a plurality of infrared switches has been described in JP-A-2013-030349.

According to the configuration of FIG. 7A, the operation button 2 can be operated to change the setting value from one to another sequentially only in one predetermined direction. Accordingly, once the setting value exceeds a desired setting value by only one, the setting value cannot be moved back, but the operation button 2 has to be operated again from the start after passing the remaining alternatives.

Assume that, for example, it is desired to select the seventh alternative from ten alternatives. In this case, when the seventh alternative is missed and switched to the eighth alternative and the eighth alternative is displayed, the seventh option cannot be displayed again immediately. It is therefore necessary to operate the operation button 2 for one cycle from 8 to 7 via 9, 10, 1, . . . 6. In order to restart from the start in this manner, extra man-hours are required to deteriorate the operability.

In addition, the operating amount of the operation button 2 and the operation button 3 for selecting numerical values of a numerical string differs from the operating amount of the operation button 2 and the operation button 3 for selecting a character string. That is, as to the character string of the setting item, a desired character string can be selected simply by pushing down the operation button 2. In the case where the numerical values of the numerical string are set, it is necessary to operate the operation button 2 to select a desired numerical value for each digit and to operate the operation button 3 to shift the current digit to a next digit.

On the other hand, according to the configuration of FIG. 7B, two operation buttons, i.e. the operation button 6 and the operation button 7, are required for switching and selecting a setting value in the ascending direction and the descending direction. Accordingly, the same function for switching and selecting a setting value cannot be integrated into one operation button. As a result, the number of components increases.

In addition, the ascending direction and the descending direction for switching the setting value are assigned to the two operation buttons 6 and 7 respectively. However, the setting value is switched and selected in either the ascending direction or the descending direction by the same pushing-down operation of the operation button 6 or the operation button 7. Therefore, the operation is not intuitive.

SUMMARY OF THE INVENTION

It is an object of the present invention to provide a transmitter which has a comparatively simple configuration and in which a setting value can be switched in ascending and descending directions intuitively by a common operation and both a numerical string and a character string can be switched.

According to a first aspect of the present invention, there is provided a transmitter. The transmitter includes: a display portion, wherein setting items for the transmitter and setting values of the setting items are displayed on the display portion; an first input receiver configured to receive a first selecting operation for selecting one of the setting items and a second selecting operation for selecting one of the setting values; a second input receiver configured to receive a switching operation for sequentially switching the setting values of the setting item which is selected by the first selecting operation in response to a rotation direction of the second input receiver; and a first controller configured to display the setting values of the selected setting item on the display portion such that the setting values are sequentially switched in response to the switching operation received by the second input receiver.

According to a second aspect of the present invention, the second input receiver is configured to be rotated in a first rotation direction or in a second rotation direction opposite to the first rotation direction. The first controller is configured to: i) display the setting values of the selected setting item on the display portion such that the setting values are sequentially switched in a forward direction when the second input receiver is rotated in the first rotation direction by the switching operation; and ii) display the setting values of the selected setting item on the display portion such that the setting values are sequentially switched in a backward direction when the second input receiver is rotated in the second rotation direction by the switching operation.

According to a third aspect of the present invention, the first input receiver is configured as a button, and the second input receiver is configured as a screw.

According to a fourth aspect of the present invention, the forward direction is a direction for increasing the setting value displayed on the display portion, and the backward direction is a direction for decreasing the setting value displayed on the display portion.

According to a fourth aspect of the present invention, the first controller is configured to determine a change amount of switching of the setting values in response to a rotation speed of the second input receiver when the second input receiver is rotated by the switching operation.

According to a sixth aspect of the present invention, the first input receiver and the second input receiver are integrated with each other.

According to a seventh aspect of the present invention, the transmitter further comprises a second controller configured to display the setting items on the display portion such that the setting items are sequentially switched and configured to determine one of the setting values when the first input receiver receives the second selecting operation.

DETAILED DESCRIPTION

Figure 1:
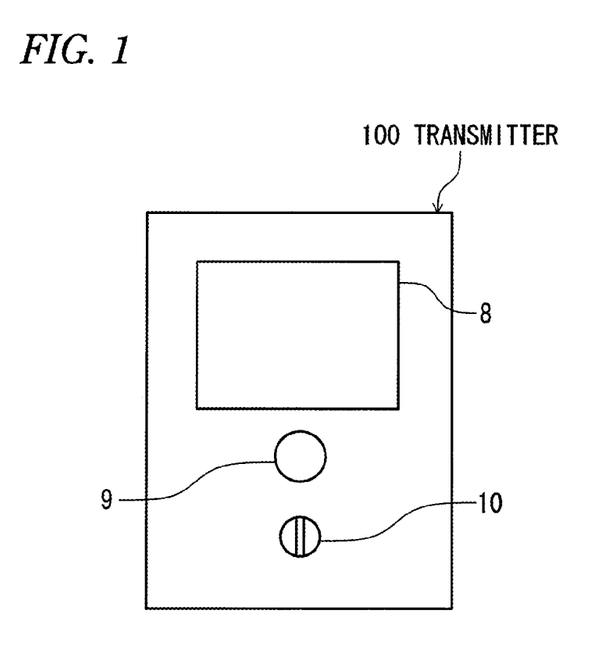
FIG. 1 is a conceptual view showing a portion of a transmitter according to an embodiment of the invention.

FIG. 1 is a conceptual view of a transmitter 100 according to an embodiment of the invention. In FIG. 1, one operation button 9 serving as a first input receiver for operating a not-shown switch from the outside is provided under a display portion 8 and one screw 10 serving as a second input receiver for performing zero adjustment from the outside is provided under the operation button 9.

Figure 8:
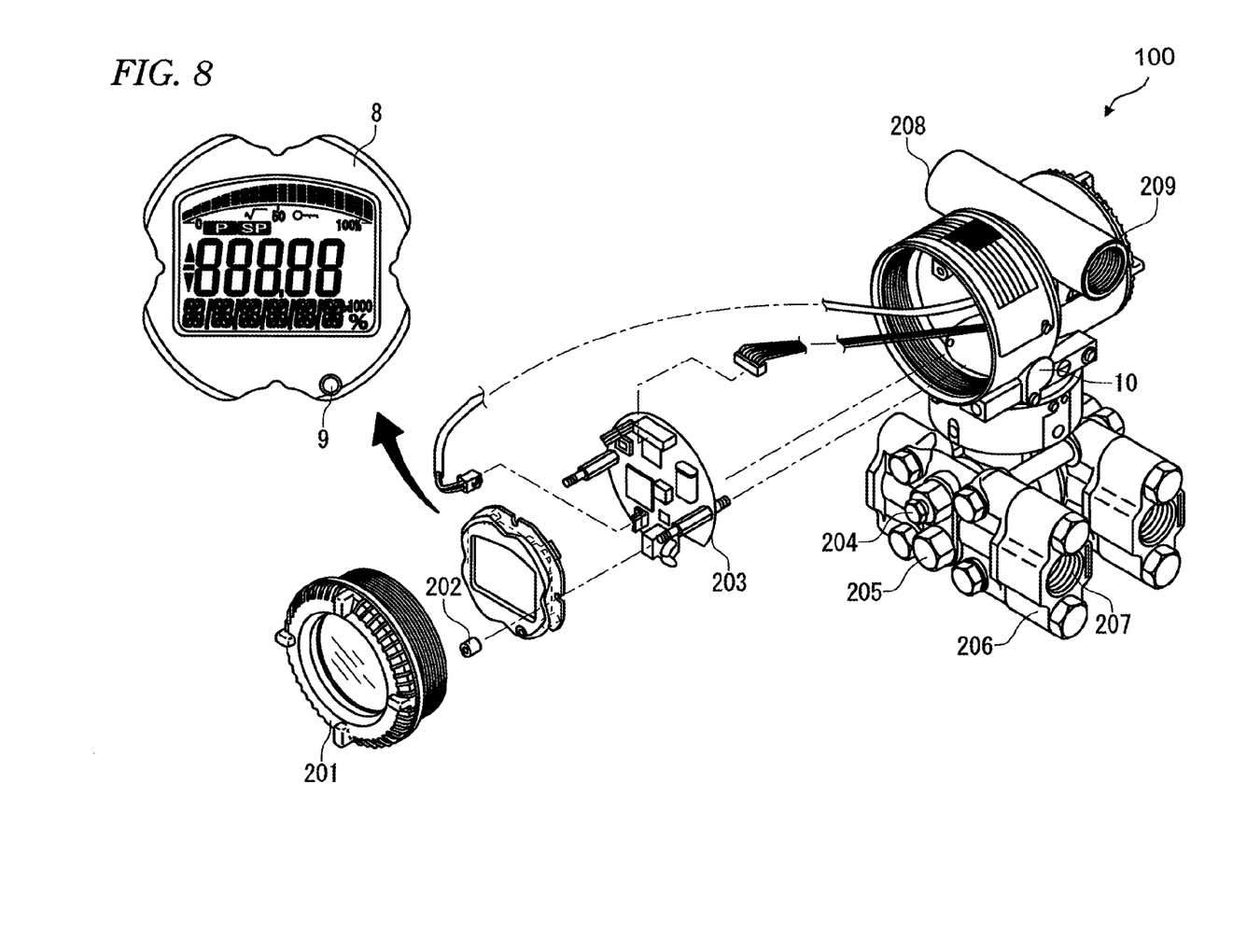
FIG. 8 is a schematic view of the transmitter according to the embodiment of the invention, wherein other mechanical elements as well as a display portion 8, an operation button 9 and a screw 10 shown in FIG. 1 are shown in the transmitter shown in FIG. 8.

FIG. 8 is a schematic view of the transmitter 100 according to the embodiment of the invention. In FIG. 8, other mechanical elements as well as the display portion 8, the operation button 9 and a screw 10 shown in FIG. 1 are shown as the mechanical configuration of transmitter 100. As other mechanical elements of the transmitter 100, an amplifier cover 201, a mounting screw 202, a CPU assembly 203, a vent plug 204, a drain plug 205, a process connector 206, a process connection 207, an external indicator conduit connection 208 and a conduit connection 209 are shown in FIG. 8, respectively.

Figure 2:
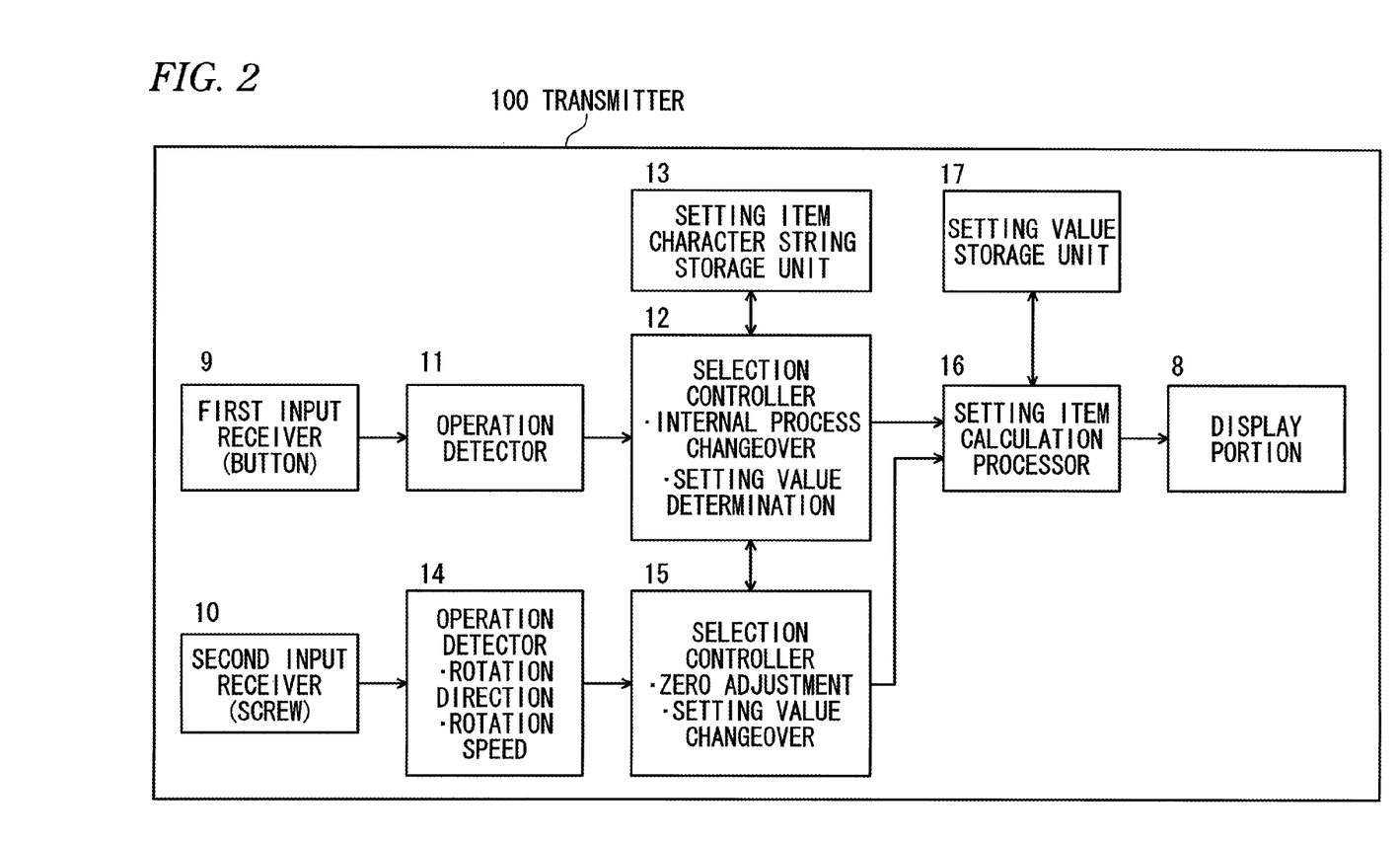
FIG. 2 is a block diagram showing an internal configuration of the transmitter shown in FIG. 1.

FIG. 2 is a block diagram showing an internal configuration of the transmitter 100 shown in FIG. 1. The internal functions are implemented based on operations of the operation button 9 and the screw 10 in FIG. 1. A contact signal of the switch changing in connection with a pushing-down operation of the operation button 9 is detected by an operation detector 11 and inputted to a selection controller 12.

The selection controller 12 executes two operations. In the first operation, a character string of a setting item stored in a setting item character string storage unit 13 is read sequentially based on the contact signal of the switch issued in connection with the pushing-down operation of the operation button 9 detected by the operation detector 11 before a rotation operation of the screw 10, so that the setting item can be switched and displayed on the display portion 8.

In the second operation, which is executed after a rotation operation of the screw 10, a setting value changed to increase/decrease by the rotation operation of the screw 10 is determined based on the contact signal of the switch issued in connection with the pushing-down operation of the operation button 9 detected by the operation detector 11. The selected character string of the setting item is inputted to the display portion 8, a selection controller 15 and a setting item calculation processor 16.

A rotational motion based on the rotation operation of the screw 10 is transmitted to an operation detector 14 which is, for example, constituted by a known rotary encoder, so that the rotation direction and the rotation speed can be detected. The detected rotation direction and the detected rotation speed are inputted to the selection controller 15.

As soon as the rotation operation of the screw 10 starts, the selection controller 15 informs the selection controller 12 of the fact that the rotation operation has started. Then, the selection controller 15 inputs a rotation operation signal to the setting item calculation processor 16.

On the setting item selected by the operation button 9, the setting item calculation processor 16 performs predetermined calculation processing based on a setting value which has been changed to increase/decrease by the screw 10 and determined by the operation button 9. Then, the setting item calculation processor 16 outputs a result of the calculation to the display portion 8 and a setting value storage unit 17. The setting value stored in the setting value storage unit 17 is read out by the setting item calculation processor 16.

Figure 3:
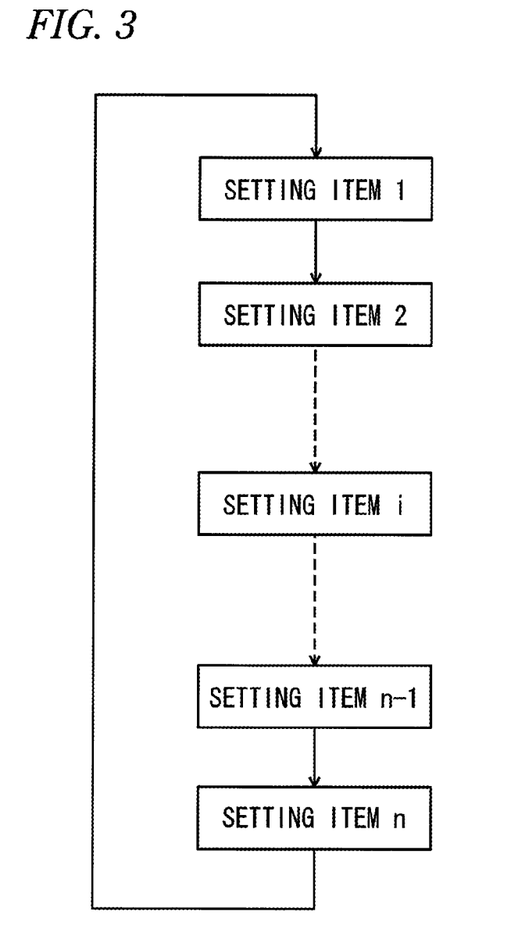
FIG. 3 is a view showing an example of transition of a display state on a display portion 8 shown in FIG. 2.

FIG. 3 is a view showing an example of transition of a display state on the display portion 8 shown in FIG. 2. The display portion 8 displays a setting item 1 in an initial state. When the operation button 9 is pushed down once in this state, the setting item displayed on the display portion 8 is switched to a setting item 2. Whenever the operation button 9 is pushed down once, in the same manner, the setting item displayed on the display portion 8 is switched to a next setting item sequentially. When the setting item displayed on the display portion 8 is switched to a setting item n via a setting time i, one cycle is completed and then the setting item 1 as the initial state will be next displayed again. In this manner, a unidirectional cycle is repeated.

Description will be made on a setting value determination operation, for example, in the state in which the operation button 9 has been pushed down once to switch the setting item to the setting item i.
1) When the screw 10 is rotated, a predetermined setting value corresponding to the setting item i is changed to increase/decrease.
2) When the operation button 9 is pushed down once in the state in which the setting value has been changed to increase/decrease to a desired setting value, the setting value is determined as the changed setting value.
3) When the operation button 9 is pushed down once, the setting item is switched to a setting item (i+1).

Figure 4:
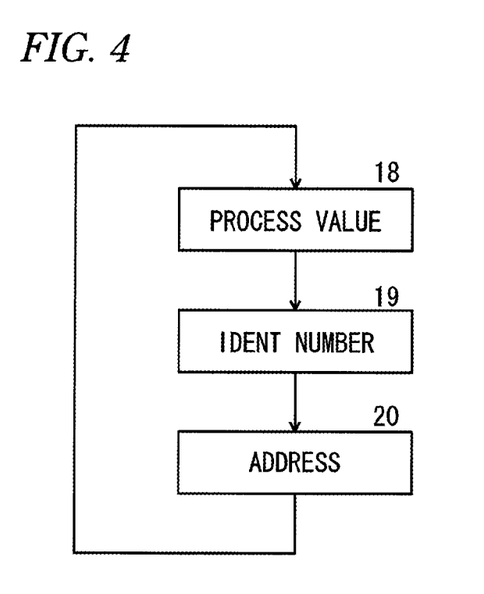
FIG. 4 is a view showing a specific example of the transition of the display state in FIG. 3.

A specific example of FIG. 3 will be described. For example, assume that there are three setting items as follows. In this case, the transition of display on the display portion 8 will be made as shown in FIG. 4.
a) Process Value 18, which is for zero adjustment
b) Identification Number 19, which is one piece of information necessary for PROFIBUS communication and used for identifying a device to communicate with
c) Address 20, which is a setting of Bus Address and which is one piece of information generally necessary for communication and used for designating a device to communicate with Incidentally, setting values which can be set in the setting items include discrete values (Identification Numbers, Addresses) and continuous values (zero points).

The normal display on the display portion 8 is the Process Value 18. When the screw 10 is rotated in the state in which the Process Value is displayed, the zero point of the Process Value 18 can be changed to increase/decrease.

When the operation button 9 is pushed down once in the state in which the Process Value 18 is displayed, the display on the display portion 8 is switched to the Identification Number 19. When the screw 10 is rotated in the state in which the Identification Number 19 is displayed, the Identification Number can be changed. When the operation button 9 is pushed down once after the screw 10 is rotated, the changed Identification Number is determined.

When the operation button 9 is pushed down once in the state in which the Identification Number 19 is displayed, the display on the display portion 8 is switched to the Address 20. When the screw 10 is rotated in the state in which the Address 20 is displayed, the Address can be changed. When the operation button 9 is pushed down once after the screw 10 is rotated, the changed Address is determined.

When the operation button 9 is pushed down once in the state in which the Address 20 is displayed, the display on the display portion 8 is returned to the normal display state to indicate the Process value 18.

Figure 5A:
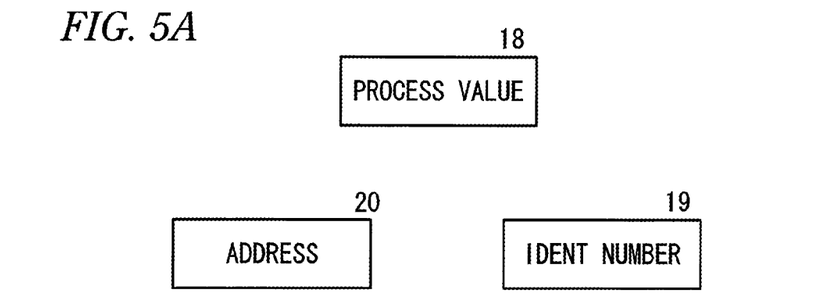
FIGS. 5A to 5C are explanatory views explaining internal processes of three setting items.

Internal processes of the three setting items consisting of the Process Value 18, the Identification Number 19 and the Address 20 will be described. As shown in FIG. 5A, these three setting items in the internal processes are independent of one another and closed to have no relevance to one another. That is, the process of the Process Value 18 does not affect the processes of the Identification Number 19 and the Address 20. The process of the Identification Number 19 does not affect the processes of the Address 20 and the Process Value 18. The process of the Address 20 does not affect the processes of the Process Value 18 and the Identification Number 19.

The display on the display portion 8 is switched synchronously with the switching of the internal processes. That is, when the internal process of the Process Value 18 is selected, the Process Value 18 is displayed. When the internal process of the Identification Number 19 is selected, the Identification Number 19 is displayed. When the internal process of the Address 20 is selected, the Address 20 is displayed.

During the internal processes, integer values are assigned separately as labels. For example, 0 is assigned to the Process Value 18, 1 is assigned to the Identification Number 19 and 2 is assigned to the Address 20.

The integer values of the labels assigned as described above are used to select one from the internal processes. For example, when the integer value 0 is selected, the internal process of the Process Value 18 is selected. When the integer value 1 is selected, the internal process of the Identification Number 19 is selected. When the integer value 2 is selected, the internal process of the Address 20 is selected.

When the operation button 9 is pushed down once in the state in which an internal process has been selected using an integer value of a label, the integer value of the label is incremented by 1. For example, when the operation button 9 is pushed down once in the state in which the integer value is 0, the integer value is incremented to 1. When the operation button 9 is pushed down once in the state in which the integer value is 1, the integer value is incremented to 2. When the operation button 9 is pushed down once in the state in which the integer value is 2, the integer value is incremented to 3. However, when the operation button 9 is pushed down once in the state in which the integer value is 2, there is no internal process assigned. Therefore, the integer value is returned to 0.

In addition, the internal process selected currently is specified based on the integer value of the label.

Figures 5B, 5C:
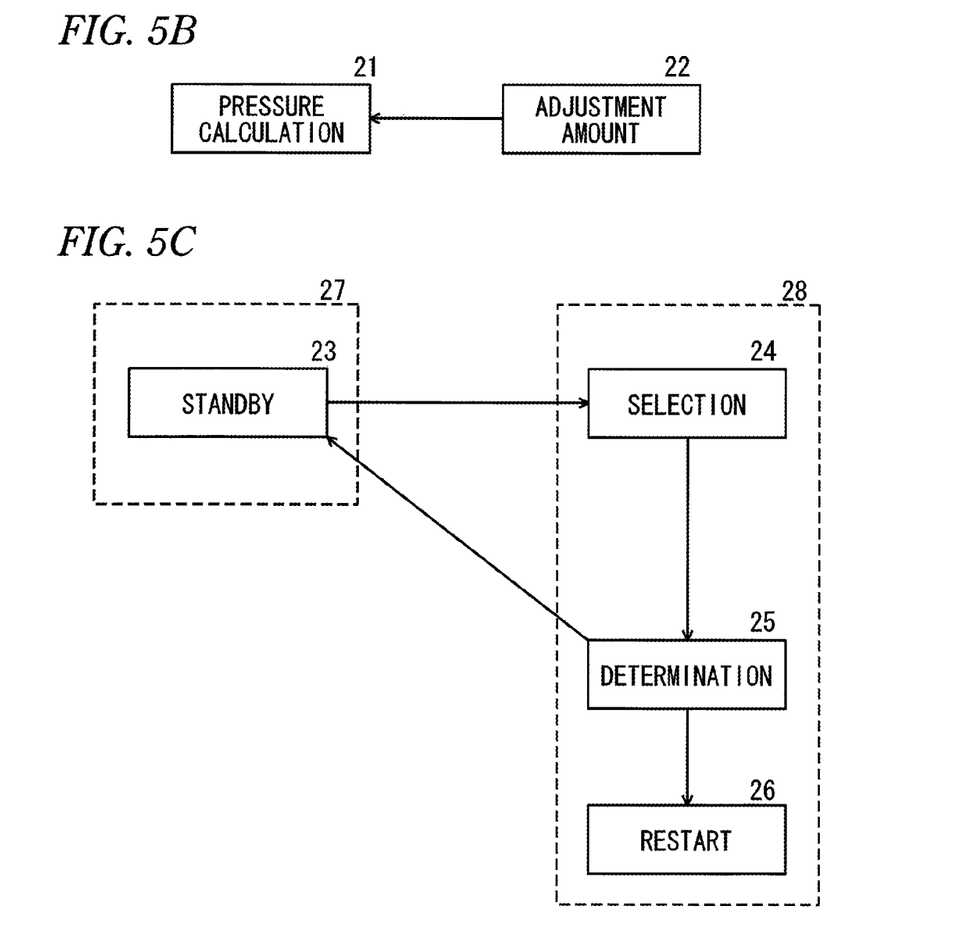

FIG. 5B is a view of state transition of the internal process of the Process Value 18 shown in FIG. 5A. The initial transition destination is pressure calculation 21. Acquired pressure is calculated in the pressure calculation 21. When the screw 10 is operated in the pressure calculation 21, an adjustment amount 22 corresponding to the operating amount of the screw 10 is reflected on the pressure calculation 21. When the screw 10 is not operated, the state of the internal process of the process value 18 transits to the pressure calculation 21.

The adjustment amount 22 is automatically reflected on the pressure calculation 21 displayed on the display portion 8. Whenever the screw 10 is operated, the adjustment amount 22 is automatically reflected on the pressure calculation 21 not as the display on the display portion 8 but as setting of internal data.

For example, the adjustment amount is a positive real number when the screw 10 is rotated clockwise. The adjustment amount is a negative real number when the screw 10 is rotated counterclockwise.

FIG. 5C is a view of state transition of the Identification Number 19 and the Address 20 shown in FIG. 5A.

The state transition will be described first.

The initial transition destination is standby 23. In the state of the standby 23, the transmitter waits for two inputs deriving from the pushing-down operation of the operation button 9 and the operation of the screw 10.

Transition starting from the standby 23 will be made as follows.
1) To transit to the standby 23 as long as the operation button 9 is not pushed down and the screw 10 is not operated.
2) To terminate the current setting item and transit to a next setting item when the operation button 9 is pushed down.
3) To transit to selection 24 when the screw 10 is operated. A desired value is selected in the selection 24.
 1) A desired Identification Number is selected from alternatives in the Identification Number 19.
 2) A desired Address is selected from alternatives in the Address 20.

Transition starting from the selection 24 will be made as follows.
1) To transit to the selection 24 as long as the operation button 9 is not pushed down.
2) To make it possible to select an alternative in a forward/backward direction when the screw 10 is operated.
3) To make selection, for example, in the forward direction when the screw 10 is rotated clockwise and in the backward direction when the screw 10 is rotated counterclockwise.
4) To transit to determination 25 when the operation button 9 is pushed down.

In the determination 25, the value selected in the selection 24 is reflected as a setting value on the internal data.

Transition starting from the determination 25 will be made as follows.
1) To transit to restart 26 when a restart process is necessary after the reflection of the setting value on the internal data.
2) To transit to the restart 26 in the Address 20 after the reflection of the setting value on the internal data.
3) To transit to the standby 23 when a restart process is not necessary after the reflection of the setting value on the internal data.
4) To transit to the standby 23 in the Identification Number 19 after the reflection of the setting value on the internal data.

The transmitter is restarted in the restart 26.

Next, management of the state transition will be described.

Each internal process is constituted by two stages, i.e. non-edition time 27 and edition time 28.

The non-edition time 27 contains the standby 23. The edition time 28 contains the selection 24, the determination 25 and the restart 26.

Transition between the non-edition time 27 and the edition time 28 has only the following three systems. Without transition from the non-edition time 27 to the edition time 28, the processing of the selection 24, the determination 25 and the restart 26 is not executed.
1) from Standby 23 to Selection 24
2) from Determination 25 to Standby 23

Next, measures to prevent erroneous setting will be described. A not-shown setting tool is used to invalidate a function of "LOCAL_OP_ENABLE". Thus, operation of the button and operation of the screw are invalidated collectively. Description will be made on operations in the case where the operation button 9 is pushed down in the condition that the function of "LOCAL_OP_ENABLE" is invalidated and in the case where the screw 10 is operated likewise.

<A. In the Case Where the Operation Button 9 is Pushed Down>

Operations in the case where the transmitter 100 is in the standby 23 will be performed as follows.
1) Not to accept any operating amount even if the operation button 9 is pushed down.
2) To display on the display portion 8 a message "FAILED" indicating that the operation is disabled.
3) To transit to the Process Value 18 after "FAILED" is displayed.

Operations in the case where the transmitter 100 is in the selection 24 will be performed as follows.
1) Not to accept any operating amount even if the operation button 9 is pushed down.
2) To display on the display portion 8 a message "FAILED" indicating that the operation is disabled.
3) To invalidate operation in the selection 24 but not to transit to the determination 25.
4) To transit to the standby 23
5) To transit to the Process Value 18 after the transition to the standby 23.

<B. In the Case Where the Screw 10 is Operated>

Operations in the case where the transmitter 100 is in the standby 23 will be performed as follows.
1) Not to accept any operating amount even if the screw 10 is operated.
2) To display on the display portion 8 a message "FAILED" indicating that the operation is disabled.
3) Not to transit to the selection 24.
4) To transit to the standby 23.

Operations in the case where the transmitter 100 is in the selection 24 will be performed as follows.
1) Not to accept any operating amount even if the screw 10 is operated.
2) To display on the display portion 8 a message "FAILED" meaning that the operation is disabled.

3) To invalidate operation in the selection 24.
4) To transit to the standby 23.

When the not-shown setting tool is used to validate a function of "WRITE_LOCK", a write operation is invalidated. However, an exception occurs in zero adjustment, in which the write operation is validated. On this occasion, a message (key mark) meaning that setting is disabled is displayed on the display portion. Description will be made on operations in the case where the operation button 9 is pushed down in the condition that the function of "WRITE_LOCK" is validated and in the case where the screw 10 is operated likewise.

<A. In the Case Where the Operation Button 9 is Pushed Down>

An operation in the case where the transmitter 100 is in the standby 23 will be performed as follows.
1) To switch to a next internal process.

Operations in the case where the transmitter 100 is in the selection 24 will be performed as follows.
1) Not to accept any operating amount even if the operation button 9 is pushed down.
2) To display on the display portion 8 a message "FAILED" indicating that the operation is disabled.
3) To invalidate operation in the selection 24 but not to transit to the determination 25.
4) To transit to the standby 23.

<B. In the Case Where the Screw 10 is Operated>

Operations in the case where the transmitter 100 is in the standby 23 will be performed as follows.
1) Not to accept any operating amount even if the screw 10 is operated.
2) To display on the display portion 8 a message "FAILED" indicating that the operation is disabled.
3) Not to transit to the selection 24.
4) To transit to the standby 23.

Operations in the case where the transmitter 100 is in the selection 24 will be performed as follows.
1) Not to accept any operating amount even if the screw 10 is operated.
2) To display on the display portion 8 a message "FAILED" indicating that the operation is disabled.
3) To invalidate operation in the selection 24.
4) To transit to the standby 23.

The case where a write operation can be executed will be described.

There are two conditions to transit to the determination 25 as follows.
1) "LOCAL_OP_ENABLE" is validated.
2) "WRITE_LOCK" is invalidated.

After transition to the determination 25 and completion of reflection on the internal data, a message "SAVED" indicating that the write operation has been completed is displayed on the display portion 8.

In the case where the value selected in the selection 24 is the same as the previous value in spite of transition to the determination 25, the following operations will be performed.
1) Not to reflect on the internal data.
2) Not to display "SAVED".

These operations are used as cancellation of the write operation.

Figure 6:
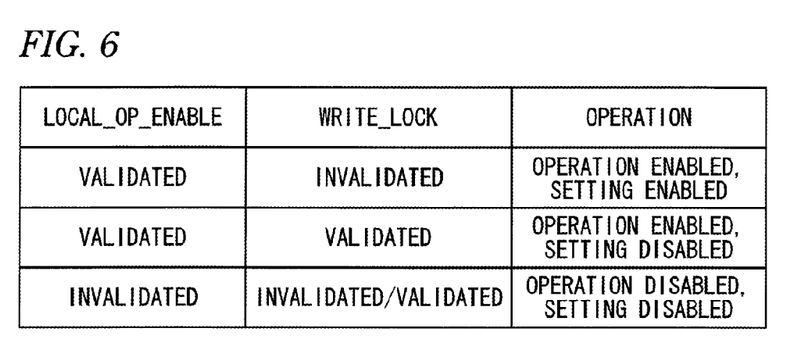
FIG. 6 is an explanatory view showing the relation between combination of validation/invalidation of "LOCAL_OP_ENABLE" and "WRITE_LOCK" and setting operation.

FIG. 6 is an explanatory view showing the relationship between combination of validation/invalidation of the aforementioned "LOCAL_OP_ENABLE" and "WRITE_LOCK" and setting operation.

a) "LOCAL_OP_ENABLE" validated and "WRITE_LOCK" invalidated, operation enabled and setting enabled
(The setting value can be either confirmed using the operation button 9 and set using the screw 10.)
b) "LOCAL_OP_ENABLE" validated and "WRITE_LOCK" validated, operation enabled and setting disabled
(The setting value can be confirmed using the operation button 9 but cannot be set using the screw 10. However, an exception occurs in zero adjustment, in which setting can be done using the screw 10.)
c) "LOCAL_OP_ENABLE" invalidated and "WRITE_LOCK" invalidated, operation disabled and setting enabled
(The setting value cannot be either confirmed using the operation button 9 or set using the screw 10.)
d) "LOCAL_OP_ENABLE" invalidated and "WRITE_LOCK" validated, operation disabled and setting disabled
(The setting value cannot be either confirmed using the operation button 9 or set using the screw 10.)

The operating amount of the screw 10 in the case where a continuous value is selected in FIG. 5B will be described.

The continuous value and the adjustment amount 22 are real-number values and the number of rotations of the screw 10 is an integer value. For example, the following change rates are assigned respectively based on the numbers of rotations of the screw 10 detected in a certain period of time.

<In the Case of the Process Value 18>
1) When the number of rotations is 0, the change rate corresponds to 0.00%.
2) When the number of rotations is 1, the change rate corresponds to 0.01%.
3) When the number of rotations is 2, the change rate corresponds to 0.03%.
4) When the number of rotations is 3, the change rate corresponds to 0.40%.
5) When the number of rotations is 4, the change rate corresponds to 1.50%.
6) When the number of rotations is 5, the change rate corresponds to 4.00%.
7) When the number of rotations is 6, the change rate corresponds to 10.00%.
8) When the number of rotations is 7 or more, the change rate corresponds to 10.00%.

The adjustment amount 22 is a value calculated based on these change rates. When the number of rotations is small, the change rate is so small that fine adjustment can be performed. When the number of rotations is large, the change rate is so large that rough adjustment can be performed.

The operating amount of the screw 10 in the case where a discrete value is selected in FIG. 5C will be described.

The discrete value, each alternative of the selection 24 and the number of rotations of the screw 10 are all integer values. The following change amounts are assigned respectively based on the numbers of rotations of the screw 10 detected in a certain period of time.

<In the Case of the Identification Number 19>
1) When the number of rotations is 0, the change amount corresponds to 0.
2) When the number of rotations is 1, the change amount corresponds to 1.
3) When the number of rotations is 2 or more, the change amount corresponds to 1.

<In the Case of the Address 20>
1) When the number of rotations is 0, the change amount corresponds to 0.
2) When the number of rotations is 1, the change amount corresponds to 1.
3) When the number of rotations is 2, the change amount corresponds to 10.
4) When the number of rotations is 3 or more, the change amount corresponds to 10.

The change amount is added to an integer value which is the alternative indicated before the screw 10 is operated, and the integer value obtained thus is set as a new alternative.

Correspondence between integer values and character strings displayed on the display portion 8 will be described.

The Identification Number in the Identification Number 19 can be set in a range of integer values 0 to 8. The integer values are assigned as labels separately and respectively to the following character strings displayed on the display portion 8.
1) "4580" corresponds to 0
2) "4581" corresponds to 1
3) "9700" corresponds to 2
4) "9701" corresponds to 3
5) "9702" corresponds to 4
6) "9740" corresponds to 5
7) "9741" corresponds to 6
8) "9742" corresponds to 7
9) "AUTO" corresponds to 8

The integer values calculated as described above are set as integer values assigned to the character strings, that is, labels respectively. When, for example, the calculated integer value is 4, "9702" to which the integer value 4 is assigned is selected as the Identification Number.

When the integer value calculated as described above is out of the range, the integer value is corrected. By this correction, cyclical selection of the Identification Number can be implemented. When, for example, the calculated integer value is −1, the integer value is corrected to 8 so that "AUTO" is selected as the Identification Number. When, for example, the calculated integer value is 9, the integer value is corrected to 0 so that "4580" is selected as the Identification Number.

The Address in the Address 20 can be set within a range of integer values 0 to 125. The integer value calculated as described above is set as the value of the selected Address. When, for example, the calculated integer value is 54, 54 is selected as the Address.

When the integer value calculated as described above is out of the range, the integer value is corrected. By this correction, cyclical selection of the Address is implemented. When, for example, the calculated integer value is −6, 120 is selected as the Address. When, for example, the calculated integer value is 134, 8 is selected as the Address.

In this manner, basic setting for establishing communication can be carried out simply by operation of the button 9 and the screw 10 in the transmitter 100 alone so that current setting information can be grasped simply by operation of the button and the screw in the transmitter alone. Thus, a dedicated device, a coupler, a terminator, etc. used for setting can be dispensed with. It may go well as long as a power supply for driving the transmitter is provided.

Incidentally, the button may be arranged as a non-contact type such as a magnetic type or an optical type.

Basic setting items may include not only items for communication setting but also items for general setting such as upper limits, lower limits and damping values.

"Digit selection" using the button and "setting for each digit" using the screw may be made for setting a numerical string or a character string.

In addition, fine adjustment/rough adjustment may be implemented in accordance with the operating amount of the screw. Incidentally, the screw used in the invention is not used for fastening and fixation but serves for rotation operation.

In addition, the button and the switch or the button and the screw do not need to be configured independently. For example, the button and the switch or the button and the screw may be formed as an integral type such as a winding crown of a watch.

In addition, configuration may be made so that the rotation motion based on the rotation operation of the screw can be detected as a rotation angle.

Configuration may be made so that the changeover operation based on the button can be performed based on physical movement of a rotary or sliding operation button etc.

In addition, although the embodiment has been described along an example where a switch which can be operated from the outside for performing changeover among display operations of the display portion is operated on the button, a switch for performing changeover between validation and invalidation of a simulation mode or a switch for performing changeover between validation and invalidation of "WRITE_LOCK" may be also arranged so that the switch can be operated on the operation button from the outside in the same manner as the switch for performing changeover among display operations of the display portion.

Further, for example, a switch for performing changeover between validation and invalidation of an integration function, between validation and invalidation of "LOCAL_OP_ENABLE", between validation and invalidation of a diagnosis function, among transmitter gauge kinds (an absolute pressure gauge, a pressure gauge and a differential pressure gauge), etc. may be arranged so that the switch can be operated on the operation button from the outside.

In addition, although a screw which can be operated from the outside in order to adjust the zero point of a measurement signal is used in the embodiment, a screw which can, for example, select a communication type, set receiver (pressure receiver) sensitivity, perform changeover between pressure reception directions (High side and Low side) in accordance with reverse connection of process piping, set a preset value of an integration function, or set a collection cycle of an abnormality history, etc. may be arranged so that the switch can be operated from the outside.

Incidentally, the operation function may be switched from one to another in accordance with the operating amount of the operation button such as the operation time thereof or the number of times of operation thereof per unit time. For example, when the button is pushed down for a short time, the button can serve as an "internal process switching" function or a "setting value selection" function. When the button is pushed down for a long time, the operation button can serve as a "setting value determination" function.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A transmitter configured to transmit a measurement signal of a measured physical amount of a process piping system, the transmitter comprising:
   a display portion, wherein setting items for the transmitter and setting values of the setting items are displayed on the display portion, the setting items including a setting item for adjusting a process value related to the measured physical amount of the process piping system, wherein the setting items include a setting item represented by a continuous value, a setting item represented by a value of a numerical string, and a setting item represented by a character string;
   a switch configured to be pressed;
   a screw configured to be rotated; and
   a processor configured to:
   in response to the switch being pressed, switch among the setting items to select one of the setting items;
   in a state where one of the setting items is selected, in response to the screw being rotated, change the setting value of the selected setting item according to a rotation direction of the screw while displaying the changed setting value on the display portion; and
   in a state where the setting value is changed, in response to the switch being pressed, determine the changed setting value as the setting value of the selected setting item,
   wherein when the setting item represented by the continuous value is selected, the processor is further configured, in response to the screw being rotated, to calculate an adjustment amount based on a change rate determined according to a number of rotation of the screw and obtain the changed setting value based on the adjustment amount,
   wherein when the setting item represented by the value of the numerical string is selected, the processor is further configured, in response to the screw being rotated, to calculate a first change amount determined according to the number of rotation of the screw and select the changed setting value assigned to an integer value which is obtained based on the first change amount, and
   wherein when the setting item represented by the character string is selected, the processor is further configured, in response to the screw being rotated, to calculate a second change amount determined according to the number of rotation of the screw and select a character string as the changed setting value assigned to an integer value which is obtained based on the second change amount.

2. The transmitter of claim 1, wherein the screw is configured to be rotated in a first rotation direction or in a second rotation direction opposite to the first rotation direction, and
   wherein the processor is configured to:
   display the setting values of the selected setting item on the display portion such that the setting values are sequentially switched in a forward direction when the screw is rotated in the first rotation direction by the switching operation; and
   display the setting values of the selected setting item on the display portion when the screw is rotated in the second rotation direction by the switching operation.

3. The transmitter of claim 2, wherein the forward direction is a direction for increasing the setting value displayed on the display portion, and the backward direction is a direction for decreasing the setting value displayed on the display portion.

4. The transmitter of claim 1, wherein the processor is configured to determine a change amount of switching of the setting values in response to a rotation speed of the screw when the screw is rotated by the switching operation.

5. The transmitter of claim 1, wherein the switch and the screw are integrated with each other.

6. The transmitter of claim 1, wherein the processor further comprises:
   a controller configured to display the setting items on the display portion such that the setting items are sequentially switched and configured to determine one of the setting values when the switch receives the second selecting operation.

7. The transmitter of claim 1, wherein the measured physical amount comprises at least one of a pressure, a temperature, and a flow rate of the process piping system.

8. The transmitter of claim 1, wherein internal processes for each setting item are independent from one another.

9. The transmitter of claim 1, wherein the measured physical amount comprises at least one of a pressure and a flow rate of the process piping system.

10. The transmitter of claim 1, wherein
    the setting item for adjusting the process value is used for zero adjustment.

11. The transmitter according to claim 1,
    wherein when the setting item represented by the continuous value is selected, the processor is further configured, in response to the screw being rotated, to calculate a change rate determined according to a number of rotation of the screw in a certain period of time, obtain the adjustment amount by multiplying the current setting value by the change rate and obtain the changed setting value by adding the adjustment amount to the current setting value, and
    wherein when the setting item represented by the value of the numerical string is selected, the processor is further configured, in response to the screw being rotated, to calculate a first change amount determined according to the number of rotation of the screw, add the first change amount to an integer value assigned to the current setting value to obtain the changed integer value, and obtain the changed setting value which is assigned to the changed integer value, and
    wherein when the setting item represented by the character string is selected, the processor is further configured, in response to the screw being rotated, to calculate a second change amount determined according to the number of rotation of the screw, add the second change amount to an integer value assigned to the current setting value to obtain the changed integer value, and obtain a character string as the changed setting value which is assigned to the changed integer value.

12. The transmitter according to claim 11,
    wherein the first change amount according to one rotation of the screw is different from the second change amount according to one rotation of the screw.

* * * * *